(12) United States Patent
Chi et al.

(10) Patent No.: US 7,983,866 B2
(45) Date of Patent: Jul. 19, 2011

(54) DEVICE TESTING SYSTEM AND TEST DATA OBTAINING METHOD

(75) Inventors: Po-Jen Chi, Taipei Hsien (TW); Shu-Min Cheng, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 455 days.

(21) Appl. No.: 12/255,648

(22) Filed: Oct. 21, 2008

(65) Prior Publication Data

US 2009/0235118 A1   Sep. 17, 2009

(30) Foreign Application Priority Data

Mar. 12, 2008   (CN) .......................... 2008 1 0300541

(51) Int. Cl.
*G06F 19/00*   (2011.01)
(52) U.S. Cl. ......................................... 702/83
(58) Field of Classification Search .................. 702/83, 702/182–185, 188
See application file for complete search history.

(56) References Cited

U.S. PATENT DOCUMENTS
2006/0230083 A1 * 10/2006 Allyn et al. ................... 707/204

FOREIGN PATENT DOCUMENTS
CN   1400832 A   3/2003
* cited by examiner

*Primary Examiner* — Edward Raymond
(74) *Attorney, Agent, or Firm* — Frank R. Niranjan

(57) ABSTRACT

A device testing system includes a detecting module, a data determining module, an address processing module, and a data obtaining module. The detecting module detects if the device testing system has been successfully connected with a device to be tested. The data determining module determines if the device testing system includes test data required by the device to be tested. The address processing module determines if an address list includes an address of the device to be tested. The data obtaining module obtains test data required by devices to be tested whose addresses are included in the address list from the remote server. A test data obtaining method of the device testing system is also provided.

18 Claims, 3 Drawing Sheets

DEVICE TESTING SYSTEM AND TEST DATA OBTAINING METHOD

BACKGROUND

1. Field of the Invention

The present disclosure relates to testing devices in a product line, and more particularly to a device testing system and a test data obtaining method.

2. Description of Related Art

Many devices on a product line, such as modems, must be configured with confidential information and required to be tested by a device testing system to maintain certain standards of quality. For example, modems must be configured with certificates that indicate their identities. This confidential information is usually stored in a remote server. The device testing system is usually connected with such a device to be tested and obtains test data from the remote server to test the device to be tested. After testing the device to be tested, the device testing system will be connected with another device to be tested and obtains the test data required by the another device from the remote server.

With the development of device testing technology of product line, the device testing system can be connected with a plurality of the devices to be tested at one time, which can significantly improve testing efficiency. However, obtaining the test data from the remote server via a network once needs a period of time for poor transmission speed of the network. Therefore, frequently obtaining the test data from the remote server definitely leads device testing technology becoming inefficient.

SUMMARY

A device testing system for obtaining test data required by a plurality of devices to be tested from a remote server. The device testing system includes a detecting module, a data determining module, an address processing module, and a data obtaining module. The detecting module is configured for detecting if the device testing system has been successfully connected with a device to be tested from the plurality of devices to be tested. The data determining module is configured for determining if the device testing system includes test data required by the device to be tested upon the condition that the device testing system has been successfully connected with the device to be tested. The address processing module is configured for initializing an address parameter that is set to a maximum of addresses of devices to be tested whose test data is in the device testing system, generating an address list according to the address parameter, and determining if the address list includes an address of the device to be tested upon the condition that the device testing system does not include test data required by the device to be tested. The data obtaining module is configured for obtaining test data required by devices to be tested whose addresses are included in the address list from the remote server upon the condition that the address list includes the address of the device to be tested.

Other advantages and novel features of the present invention will be drawn from the following detailed description, in which:

DETAILED DESCRIPTION OF CERTAIN INVENTIVE EMBODIMENTS

Figure 1:
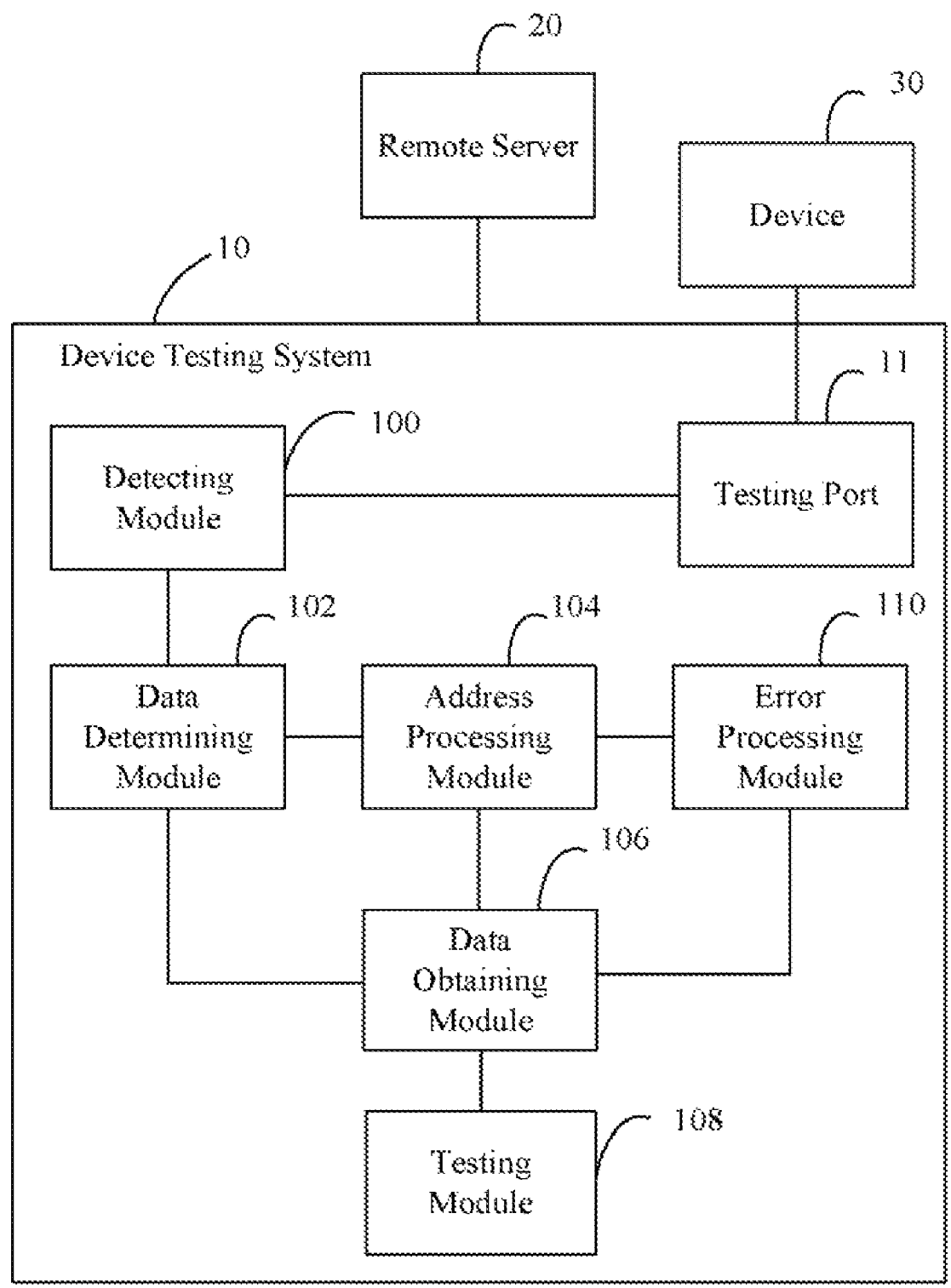
FIG. 1 is a schematic diagram of one embodiment of functional modules of a device testing system in accordance with the present disclosure.

FIG. 1 is a schematic diagram of one embodiment of functional modules of a device testing system 10 in accordance with the present disclosure.

The device testing system 10 is connected with a remote server 20 and one or more devices to be tested, such as a device 30. The device testing system 10 is configured for obtaining test data from the remote server 20. The test data is required by the device 30 for testing one or more components or operations of the device 30. In one embodiment, the device 30 may be a modem including test data, such as a certificate indicating an identity of a respective modem. Additionally, the device 30 has an media access control (MAC) address for distinguishing it from other devices to be tested. The device testing system 10 obtains the test data according to the addresses of the devices to be tested.

In one embodiment, the device testing system 10 includes a detecting module 100, a data determining module 102, an address processing module 104, a data obtaining module 106, and a testing module 108. The modules 100, 102, 104, 106, 108 may be used to execute one or more operations for the device testing system 10 as will be further explained herein.

The detecting module 100 is configured for detecting if the device testing system 10 has been successfully connected with one device to be tested. In the embodiment, take the device 30 for example. In one embodiment, the device testing system 10 includes a plurality of testing ports 11. Each testing port 11 is configured for connecting with one of the devices to be tested. The detecting module 100 detects the device testing system 10 has been successfully connected with the device 30 if at least one testing port 11 has been connected with one at least one of the devices to be tested.

The data determining module 102 is configured for determining if the device testing system 10 includes the test data required by the device 30. In one embodiment, the device testing system 10 obtains test data from the remote server 20 to a local memory system during testing. In one embodiment, the local memory system may be a temporary cache in the device testing system 10. In one embodiment, if the detecting module 100 detects the device testing system 10 has been successfully connected with the device 30, the data determining module 102 determines if the device testing system 10 includes the test data required by the device 30.

The address processing module 104 is configured for presetting an initial value of an address parameter, generating an address list according to the address parameter, and determining if the address list includes the address of the device 30. In one embodiment, the address parameter is a variable parameter and is set to a maximum of addresses of devices to be tested whose test data had been obtained from the remote server 20 to the device testing system 10. The initial value of the address parameter may be 0.

In one embodiment, the address list includes MAC addresses of several sequential devices to be tested and varies along with the address parameter. In one example, the address list may include MAC addresses from (the address parameter+1) to (the address parameter+10). In another example, the address list may include MAC addresses from (the address parameter+1) to (the address parameter+1+the number of the testing ports 11 * 2).

In one embodiment, if the data determining module 102 has determined that the test data required by the device 30 does not exist in the device testing system 10, the address processing module 104 determines if the address list includes the address of the device 30.

The data obtaining module 106 is configured for obtaining test data required by devices to be tested whose addresses are included in the address list from the remote server 20 upon the condition that the test data required by the device 30 does not exist in the device testing system 10 and the address list includes the address of the device 30.

The testing module 108 is configured for testing the device 30 according to the test data exists in the device testing system 10 and for determining if a testing has been completed. In one embodiment, the testing has been completed if all of the one or more devices to be tested have been tested. If the testing has not been completed, the detecting module 100 continuously detects if another device to be tested has been successfully connected to the device testing system 10.

Therefore, the device testing system 10 may include test data required by the another device to be tested if the address list also includes an address of the another device to be tested. As a result, if the detecting module 100 detects that the another device to be tested has been successfully connected to the device testing system 10, the testing module 108 directly uses the test data in the device testing system 10 to test the another device to be tested until test data in the device testing system 10 has been used for testing. Subsequently, a next plurality of test data for a next series of devices to be tested is obtained from the remote server 20 to the device testing system 10, wherein the next plurality of test data corresponds to a new address list updated by the address processing module 104. As such, the address processing module 104 is further configured for updating the address parameter according to the address list, namely, setting the address parameter to the last address in the address list. The address processing module 104 is further configured for regenerating the address list according to the updated address parameter to acquire an updated address list.

In another embodiment, in order to further increase testing efficiency, the data determining module 102 is further configured for presetting a threshold indicating a permitted minimum amount of the test data in the device testing system 10 and determining if the amount of test data in the device testing system 10 is less than the threshold. For example, the threshold may be 0 or 5. If the data determining module 102 has determined the amount of test data in the device testing system 10 is less than the threshold, the data obtaining module 106 obtains more test data from the remote server 20 to the device testing system 10 according to the updated address list. If the data determining module 102 has determined the amount of test data in the device testing system 10 is not less than the threshold, the testing module 108 directly tests the device 30 according to the test data in the device testing system 10.

The address processing module 104 is further configured for setting the address parameter to the address of the device 30 if the address list does not include the address of the device 30, subsequently regenerating the address list. As such, test data required by the device 30 is still in the remote server 20, and subsequently, the data obtaining module 106 obtains the test data required by the device 30 from the remote server 20 to the device testing system 10.

In another embodiment of the present disclosure, the device testing system 10 further includes an error processing module 110. The error processing module 110 is configured for presetting an initial value of an error number and a maximum error number, which is for processing the condition that the address list does not include the address of the device 30. The error number indicates a times of the address processing module 104 determining the address list does not include the address of the device 30. The maximum error number indicates a permitted maximum of the error number, such as 5. The error processing module 110 is further configured for increasing the error number if the address list does not include the address of the device 30, and determining if the error number is less than the maximum error number. In one embodiment, if the address processing module 104 determines that the address list does not include the address of the device 30, the error processing module 110 increases the error number and determines if the error number is less than the maximum error number.

The address processing module 104 is further configured for presetting an initial value of a maximum untested address, which is for processing the condition that the address list does not include the address of the device 30. In one embodiment, the maximum untested address is a variable and the initial value of the maximum untested address may be 0.

If the error processing module 110 determines the error number is less than the maximum error number, the address processing module 104 is further configured for determining if the address of the device 30 is greater than the maximum untested address. If the address of the device 30 is greater than the maximum untested address, the address processing module 104 sets the maximum untested address to the address of the device 30. The test data required by the device 30 is still in the remote server 20 and, subsequently, the data obtaining module 106 obtains the test data required by the device 30 from the remote server 20 to the device testing system 10.

If the error processing module 110 determines that the error number is not less than the maximum error number, the address processing module 104 is further configured for setting the address parameter to the maximum untested address and regenerating the address list according to the address parameter. The error processing module 110 is further configured for setting the error number to the initial value of the error number. The test data required by the device 30 is still in the remote server 20, and subsequently, the data obtaining module 106 obtains the test data required by the device 30 from the remote server 20 to the device testing system 10.

Figure 2A:
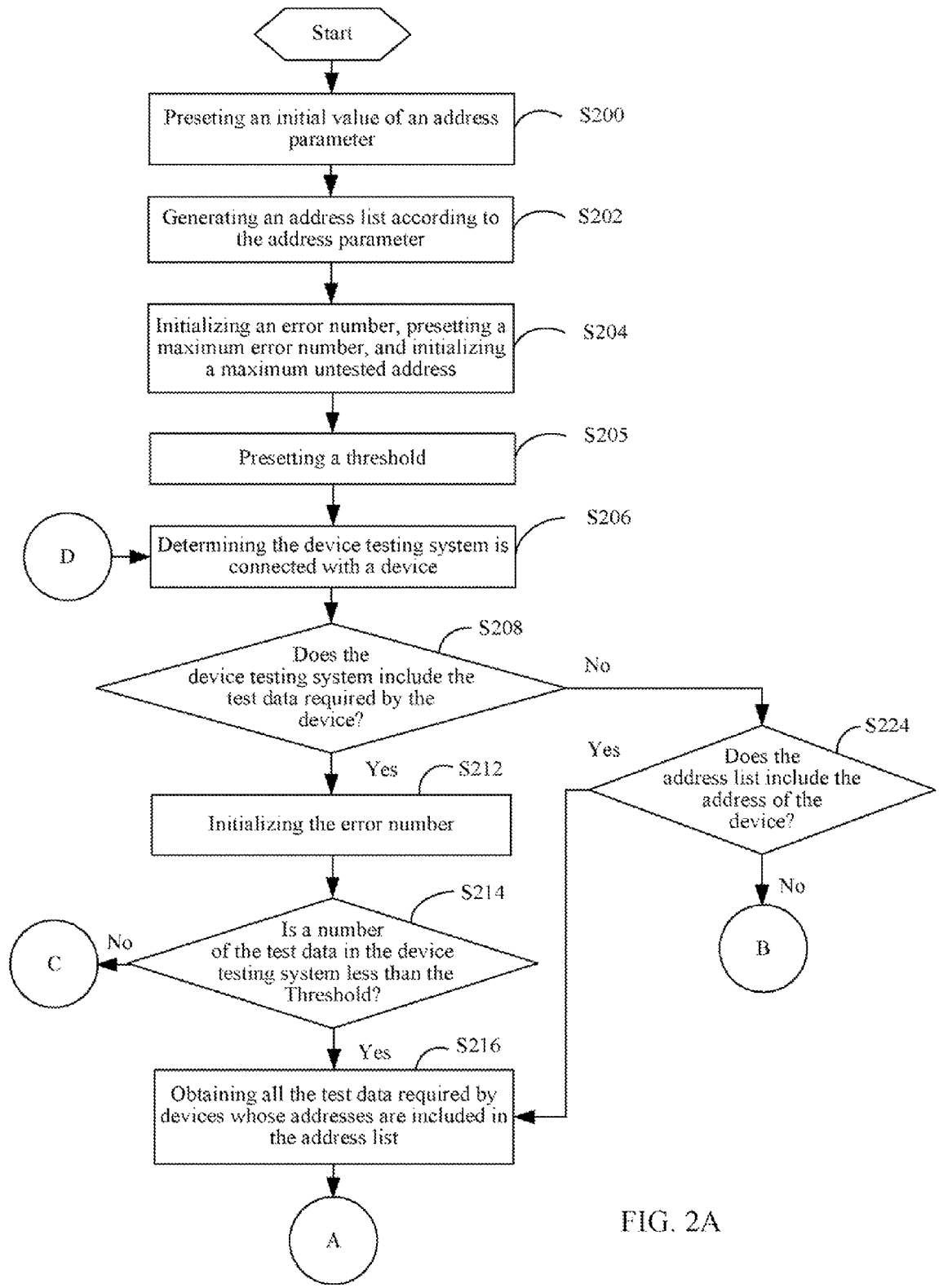
FIG. 2A and FIG. 2B are flowcharts of one embodiment of a test data obtaining method of the device testing system in accordance with the present disclosure.
Figure 2B:
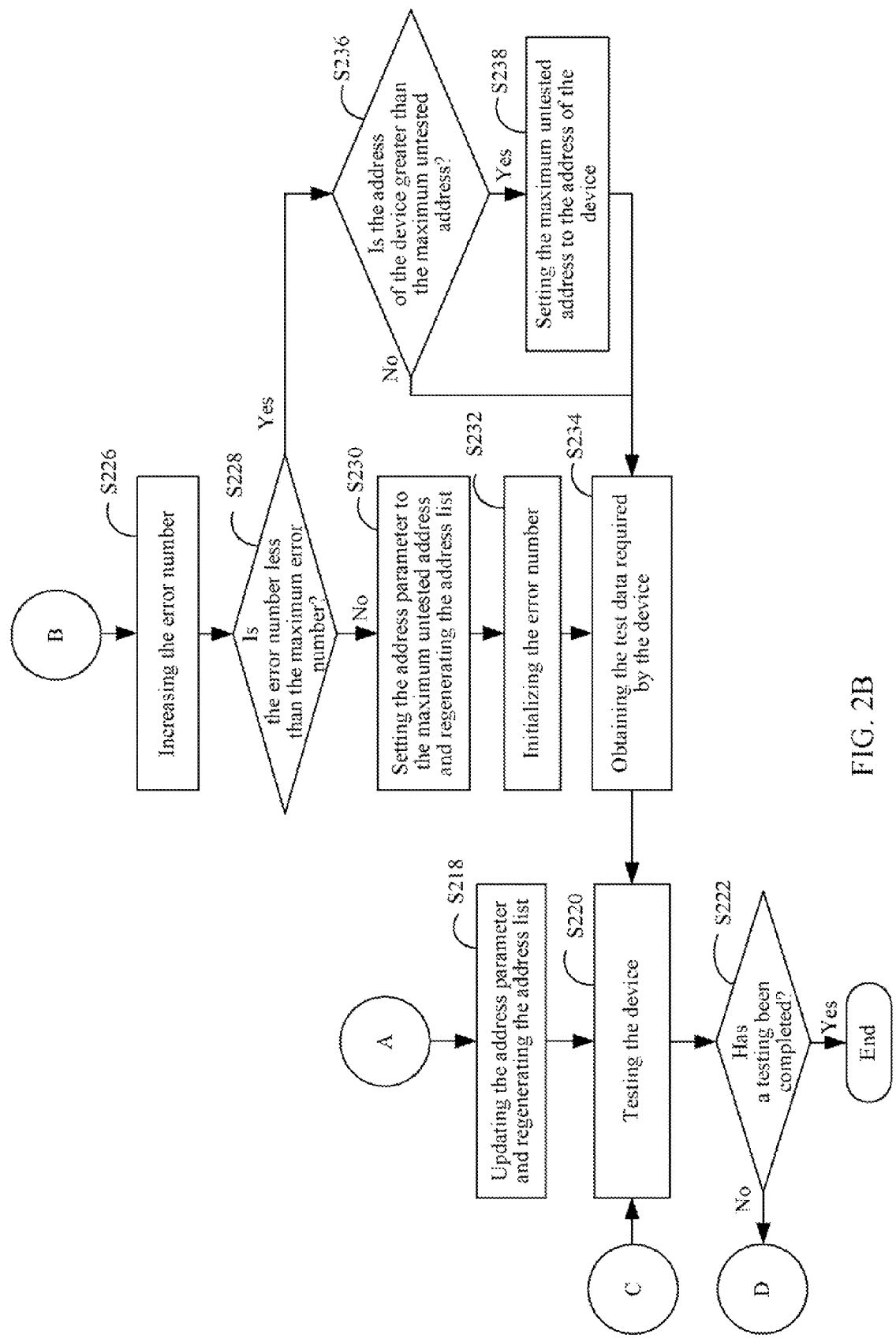

FIG. 2A and FIG. 2B are flowcharts of one embodiment of a test data obtaining method of the device testing system 10 in accordance with the present disclosure. In one embodiment, the test data obtaining method shown in FIG. 2A and FIG. 2B is executed via the functional modules shown in FIG. 1. It may be understood that additional blocks may be added, others removed, and ordering of the blocks may be changed depending on the embodiment.

In block S200, the address processing module 104 presets an initial value of an address parameter. In one embodiment, the address parameter is a variable parameter and is set to a maximum of addresses of devices to be tested whose test data had been obtained from the remote server 20 to the device testing system 10. For example, the initial value of the address parameter may be 0.

In block S202, the address processing module 104 generates an address list according to the address parameter. In one embodiment, the address list includes MAC addresses of several sequential devices to be tested and varies along with the address parameter. In one example, the address list may include MAC addresses from (the address parameter+1) to (the address parameter+10). In another example, the address list may include MAC addresses from (the address parameter+1) to (the address parameter+1+the number of the testing ports 11 * 2).

In block S204, the error processing module 110 initializes an error number, presets a maximum error number, and initializes a maximum untested address, which is for processing the condition that the address list does not include the address of the devices to be tested. The error number indicates a times of the address processing module 104 determining the address list does not include the address of the devices to be tested. The maximum error number indicates a permitted maximum of the error number, such as 5. In another embodiment, block S204 may not be executed.

In block S205, the data determining module 102 presets a threshold indicating a permitted minimum amount of the test data in the device testing system 10. For example, the threshold may be 0 or 5. In another embodiment, block S205 may not be executed.

In block S206, the detecting module 100 continuously determines if the device testing system 10 has been successfully connected with one or more devices to be tested. In one embodiment, take a device 30 for example.

In block S208, the data determining module 102 determines if the device testing system 10 includes the test data required by the device 30.

If the device testing system 10 does not include the test data required by the device 30, then in block S224, the address processing module determines if the address list includes the address of the device 30.

If the address list includes the address of the device 30, then in block S216, the data obtaining module 106 obtains all the test data required by devices to be tested whose addresses are included in the address list. In one particular embodiment, the data obtaining module 106 obtains ten pieces of test data at a time from the remote server 20 to the device testing system 10. As such, the ten pieces of test data includes the test data required by the device 30.

Referring to FIG. 2B, in block S218, the address processing module 104 updates the address parameter according to the address list and regenerates the address list according to the updated address parameter.

In block S220, the testing module 108 tests the device 30 according to the test data in the device testing system 10 obtained from the remote server 20.

In block S222, the testing module 108 determines if a testing has been completed. In one embodiment, the testing has been completed indicates that all the devices to be tested in the product line have been thoroughly tested.

If the test has not been completed, then returning to block S206, the detecting module 100 continuously detects if the device testing system 10 has been successfully connected with a subsequent device to be tested of the more devices to be tested.

Referring back to FIG. 2A, if the data determining module 102 determines the device testing system 10 includes the test data required by the device 30, then in block S212, the error processing module 110 initializes the error number, that is, sets the error number to the initial value of the error number. In one embodiment, if the error processing module 110 determines that the error number is equal to the initial value of the error number, then block S212 does not need to be executed.

In block S214, the data determining module 102 determines if the number of the test data in the device testing system 10 is less than the threshold.

If the number of the test data in the device testing system 10 is less than the threshold, then in block S216, the data obtaining module 106 obtains all the test data required by the devices to be tested whose addresses are included in the address list. For instance, if the number of the test data in the device testing system 10 is less than 5, then the data obtaining module 106 obtains the subsequent 10 pieces of test data from the remote server 20 to the device testing system 10.

If the number of the test data in the device testing system 10 is not less than the threshold, then returning to block S220 in FIG. 2B, the testing module 108 tests the device 30 according to the test data directly obtained from the device testing system 10.

In another embodiment, block S205, block S212 and block S214 are not executed. Block S220 is directly executed after block S208. As such, the data obtaining module 106 obtains the subsequent 10 pieces of test data from the remote server 20 to the device testing system 10 after all the test data in the device testing system 10 have been completely used for testing.

Referring to FIG. 2A and FIG. 2B, if the address list does not include the address of the device 30, which is determined in block S224 of FIG. 2A, then the error processing module 110 increases the error number, which is executed in block S226 of FIG. 2B.

In block S228, the error processing module 110 determines if the error number is less than the maximum error number.

If the error number is less than the maximum error number, then in block S236, the address processing module 104 determines if the address of the device 30 is greater than the maximum untested address.

If the address of the device 30 is greater than the maximum untested address, then in block S238, the address processing module 104 sets the maximum untested address to the address of the device 30.

In block S234, the data obtaining module 106 obtains the test data required by the device 30 to the device testing system 10. In one embodiment, if the address of the device 30 is not greater than the maximum untested address, then block S238 does not need to be executed and block S234 is directly executed after block S236.

If the error number is not less than the maximum error number, in block S230, the address processing module 104 sets the address parameter to the maximum untested address and regenerates the address list according to the updated address parameter.

In block S232, the error processing module 110 initializes the error number, that is, sets the error number to the initial value of the error number.

In a further embodiment, block S204, block S212, block S226, block S228 and block S232 are not executed. Block S236 is directly executed after block S224 if the address of the device 30 is not included in the address list. Block S230 is directly executed after block S228, followed by the execution of block S234.

The device testing system 10 in one of the embodiments of the disclosure obtains a plurality of test data from the remote server 20 to the device testing system 10 each time, which increases the efficiency of the testing process.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A device testing system for obtaining test data required by a plurality of devices to be tested from a remote server, comprising:

a detecting module configured for detecting if the device testing system has been successfully connected with a device to be tested from the plurality of devices to be tested;

a data determining module configured for determining if the device testing system comprises test data required by the device to be tested upon the condition that the device testing system has been successfully connected with the device to be tested;

an address processing module configured for initializing an address parameter that is set to a maximum of addresses of devices to be tested whose test data is in the device testing system, generating an address list according to the address parameter, and determining if the address list comprises an address of the device to be tested upon the condition that the device testing system does not comprise test data required by the device to be tested; and a data obtaining module, configured for obtaining test data required by devices to be tested whose addresses are comprised in the address list from the remote server upon the condition that the address list comprises the address of the device to be tested.

2. The device testing system as claimed in claim 1, wherein the address of the device to be tested comprises a media access control address of the device to be tested.

3. The device testing system as claimed in claim 2, further comprising a testing module, configured for testing the device to be tested according to the test data in the device testing system, and for determining if a testing has been completed.

4. The device testing system as claimed in claim 3, wherein the address processing module is further configured for updating the address parameter according to the address list and for regenerating the address list according to the updated address parameter.

5. The device testing system as claimed in claim 3, wherein the data determining module is further configured for presetting a threshold indicating a permitted minimum amount of the test data in the device testing system and determining if the amount of test data in the device testing system is less than the threshold.

6. The device testing system as claimed in claim 3, wherein the address processing module is further configured for initializing a maximum untested address, determining if the address of the device to be tested is greater than the maximum untested address upon the condition that the address list does not comprise the address of the device to be tested, and setting the maximum untested address to the address of the device to be tested upon the condition that the address list does not comprise the address of the device to be tested.

7. The device testing system as claimed in claim 6, wherein the address processing module is further configured for setting the address parameter to the maximum untested address and for regenerating the address list according to the updated address parameter.

8. The device testing system as claimed in claim 7, wherein the data obtaining module is further configured for obtaining the test data required by the device to be tested from the remote server to the device testing system.

9. The device testing system as claimed in claim 8, further comprising an error processing module configured for initializing an error number, presetting a maximum error number, increasing the error number upon the condition that the address list does not comprise the address of the device to be tested, and determining if the error number is less than the maximum error number.

10. The device testing system as claimed in claim 9, wherein the address processing module is further configured for determining if the address of the device to be tested is greater than the maximum untested address upon the condition that the error number is less than the maximum error number.

11. A test data obtaining method of a device testing system in communication with a remote server for obtaining test data required by a plurality of devices to be tested from the remote server, the method comprising:

initializing an address parameter that is set to a maximum of addresses of devices to be tested whose test data is in the device testing system;

generating an address list according to the address parameter;

detecting if the device testing system has been successfully connected with a device to be tested from the plurality of devices to be tested;

determining if the device testing system comprises test data required by the device to be tested upon the condition that the device testing system has been successfully connected with the device to be tested;

determining if the address list comprises an address of the device to be tested upon the condition that the device testing system does not comprise test data required by the device to be tested; and obtaining test data required by devices to be tested whose addresses are comprised in the address list from the remote server upon the condition that the address list comprises the address of the device to be tested.

12. The test data obtaining method as claimed in claim 11, wherein the address of the device to be tested comprises a media access control address of the device to be tested.

13. The test data obtaining method as claimed in claim 12, further comprising:

updating the address parameter according to the address list and regenerating the address list according to the updated address parameter;

testing the device to be tested according to the test data in the device testing system;

determining if the testing has been completed; and continuously detecting if the device testing system has been successfully connected with another device to be tested upon the condition that the testing has not been completed.

14. The test data obtaining method as claimed in claim 13, further comprising:

testing the device to be tested according to the test data in the device testing system if the device testing system does not comprise the test data required by the device to be tested.

15. The test data obtaining method as claimed in claim 13, further comprising:

presetting a threshold indicating a permitted minimum amount of the test data in the device testing system;

determining if the amount of test data in the device testing system is less than the threshold upon the condition that the device testing system comprises the test data required by the device to be tested;

obtaining the test data required by devices to be tested whose addresses are in the address list from the remote server to the device testing system upon the condition that the amount of test data in the device testing system is less than the threshold; and testing the device to be tested according to the test data in the device testing system upon the condition that the amount of test data in the device testing system is not less than the threshold.

16. The test data obtaining method as claimed in claim 13, further comprising:
  initializing a maximum untested address;
  determining if the address of the device to be tested is greater than the maximum untested address upon the condition that the address list does not comprise the address of the device to be tested;
  setting the maximum untested address to the address of the device to be tested upon the condition that the address of the device to be tested is greater than the maximum untested address;
  setting the address parameter to the maximum untested address and regenerating the address list according to the updated address parameter; and
  obtaining the test data required by the device to be tested from the remote server to the device testing system.

17. The test data obtaining method as claimed in claim 13, further comprising:
  initializing an error number and presetting a maximum error number;
  initializing a maximum untested address;
  increasing the error number upon the condition that the address list does not comprise the address of the device to be tested;
  determining if the error number is less than the maximum error number;
  setting the address parameter to the maximum untested address and regenerating the address list according to the updated address parameter upon the condition that the error number is not less than the maximum error number;
  initializing the error number; and
  obtaining the test data required by the device to be tested from the remote server to the device testing system.

18. The test data obtaining method as claimed in claim 17, further comprising:
  determining if the address of the device to be tested is greater than the maximum untested address upon the condition that the error number is less than the maximum error number; and
  setting the maximum untested address to the address of the device to be tested upon the condition that the address of the device to be tested is greater than the maximum untested address.

* * * * *